United States Patent
Wu et al.

(10) Patent No.: US 7,765,993 B2
(45) Date of Patent: Aug. 3, 2010

(54) COMPRESSOR INLET DUCT

(75) Inventors: Ko-Jen Wu, Troy, MI (US); Jian Jun Zhang, Rochester, MI (US); William F. Spruit, Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 789 days.

(21) Appl. No.: 11/696,963

(22) Filed: Apr. 5, 2007

(65) Prior Publication Data
US 2008/0247862 A1     Oct. 9, 2008

(51) Int. Cl.
*F02B 33/00* (2006.01)
*F01C 1/24* (2006.01)
(52) U.S. Cl. .......... 123/559.1; 418/206.4; 138/DIG. 11
(58) Field of Classification Search .............. 123/559.1; 418/206.4, 201.1, 201.2, 205; 138/39, 44, 138/DIG. 11
See application file for complete search history.

(56) References Cited
U.S. PATENT DOCUMENTS

| | | | | |
|---|---|---|---|---|
| 5,911,211 A | * | 6/1999 | Uchida | .................... 123/559.1 |
| 7,052,259 B2 | * | 5/2006 | Nachi | ....................... 418/206.4 |
| 7,497,196 B2 | * | 3/2009 | Prior | ...................... 123/184.57 |
| 2004/0194766 A1 | * | 10/2004 | Prior et al. | ............... 123/559.1 |
| 2006/0157036 A1 | * | 7/2006 | Andersen | .................. 123/559.1 |
| 2006/0263230 A1 | | 11/2006 | Swartzlander | |

* cited by examiner

*Primary Examiner*—Thomas E Denion
*Assistant Examiner*—Mary A Davis
(74) *Attorney, Agent, or Firm*—Quinn Law Group, PLLC

(57) ABSTRACT

An inlet for a compressor having a housing defining a generally C-shaped inlet opening and a rotor cavity configured to contain first and second rotors is provided. The inlet includes an inlet duct defining an inlet opening and a generally C-shaped outlet opening. The inlet duct has an inner wall defining a cavity operable to communicate airflow between the inlet opening and the generally C-shaped outlet opening. The generally C-shaped outlet opening of the inlet duct is substantially similar to the shape of the generally C-shaped inlet opening of the housing. The inner wall includes a floor portion and a roof portion. At least a portion of the floor portion is contoured to impart a velocity component to the airflow complementary to the tangential velocity of each of the first and second rotors during rotation of the first and second rotors.

18 Claims, 4 Drawing Sheets

COMPRESSOR INLET DUCT

TECHNICAL FIELD

The present invention relates to an inlet duct for a compressor or supercharger.

BACKGROUND OF THE INVENTION

Compressors or superchargers may be mounted to an internal combustion engine to increase the performance thereof. The compressor is operable to induct air through an inlet duct to interleaved and counter-rotating first and second rotors. The first and second rotors cooperate to increase the volume of air communicated to the internal combustion engine, thereby increasing the volumetric efficiency of the internal combustion engine.

SUMMARY OF THE INVENTION

An inlet apparatus for a compressor having a housing defining a generally C-shaped inlet opening and a rotor cavity configured to contain interleaved, counter-rotating first and second rotors is provided. The inlet apparatus includes an inlet duct positioned upstream of the compressor and defining an inlet opening and a generally C-shaped outlet opening. The inlet duct has an inner wall defining a cavity operable to communicate airflow between the inlet opening and the generally C-shaped outlet opening of the inlet duct. The generally C-shaped outlet opening of the inlet duct is substantially similar to the shape of the generally C-shaped inlet opening of the housing. The inner wall includes a floor portion and a roof portion each extending from the inlet opening to the outlet opening. At least a portion of the floor is contoured to impart a velocity component to the airflow complementary to the tangential velocity of each of the first and second rotors during rotation of the first and second rotors.

The inlet duct may further include first and second ridges formed centrally on the respective floor and roof portions each extending toward the outlet opening of the inlet duct. The first and second ridges preferably increase in at least one of height and width moving toward the outlet opening of the inlet duct. The first and second ridges are operable to impart a velocity component to the airflow complementary to the tangential velocity of each of the first and second rotors during rotation of the first and second rotors.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
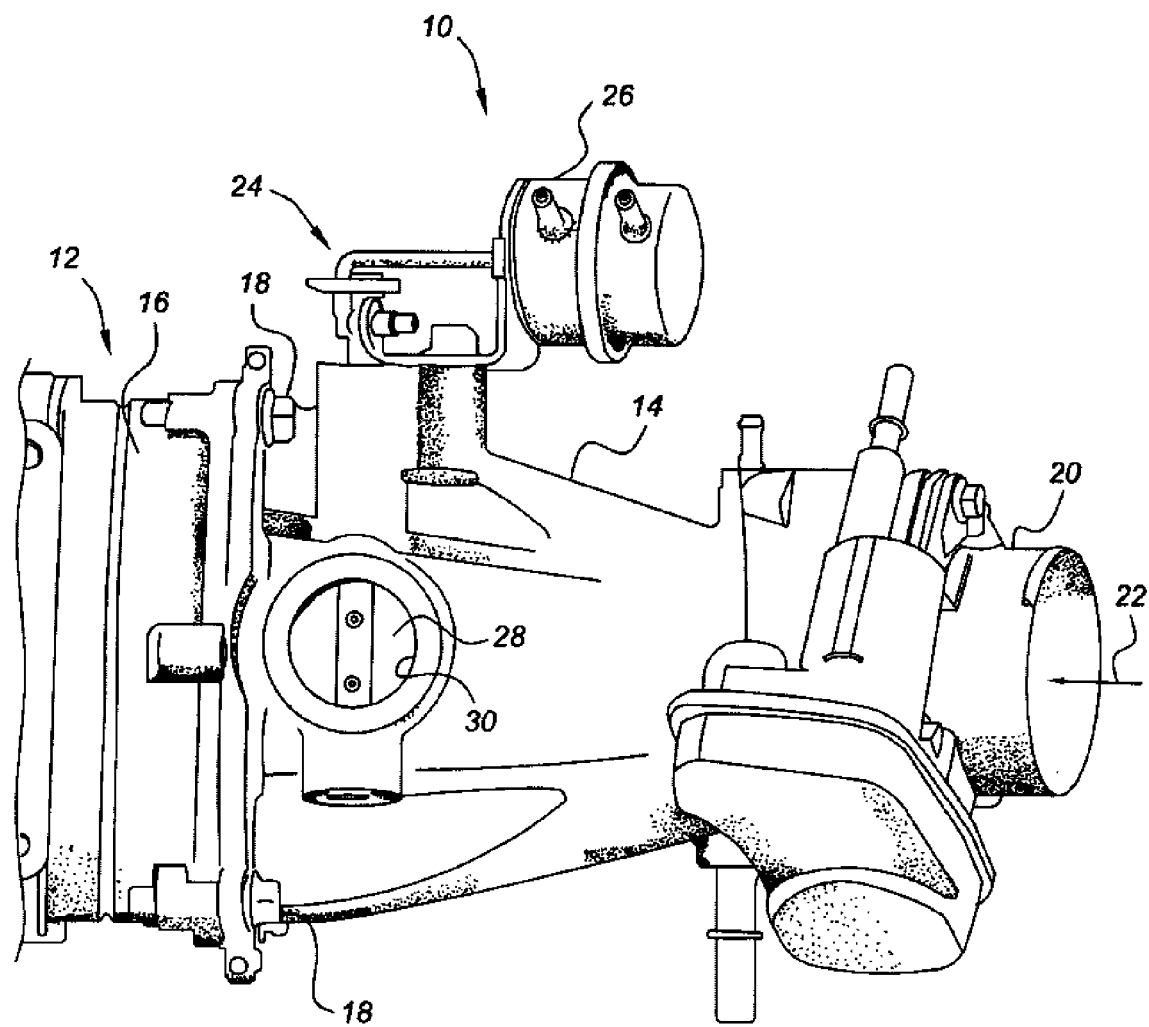
FIG. 1 is a bottom view of a portion of a supercharger or compressor having an inlet duct mounted thereto.

Referring to the drawings wherein like reference numbers correspond to like or similar components throughout the several figures, there is shown in FIG. 1 a supercharger or compressor assembly 10. The compressor assembly 10 is configured to mount to an internal combustion engine, not shown. Those skilled in the art of engine design will recognize that the compressor assembly 10 can be used to increase the volumetric efficiency of an internal combustion engine, thereby increasing the performance thereof. The compressor assembly 10 includes a compressor 12 and an inlet duct 14. The compressor 12 includes a housing 16 configured to contain internal components of the compressor 12. The housing 16 is preferably formed from cast metal, such as aluminum or magnesium. The inlet duct 14 is mounted to the housing 16 via a plurality of fasteners 18. The inlet duct 14 may be formed integrally with the housing 16. The inlet duct 14 is preferably formed from cast metal such as aluminum or magnesium; however, the inlet duct 14 may be formed from a plastic or composite material while remaining within the scope of that which is claimed.

A throttle body 20 is mounted with respect to the inlet duct 14 and is operable to vary the amount of airflow, indicated as arrow 22, entering the inlet duct 14. A bypass assembly 24 is mounted with respect to the inlet duct 14 and is operable to selectively divert airflow 22 from the compressor 12 during certain modes of engine operation, such as light load engine operation. The bypass assembly 24 includes an actuator 26 operable to selectively and variably open a valve 28 disposed within a bypass passage 30 defined by the inlet duct 14.

Figure 2:
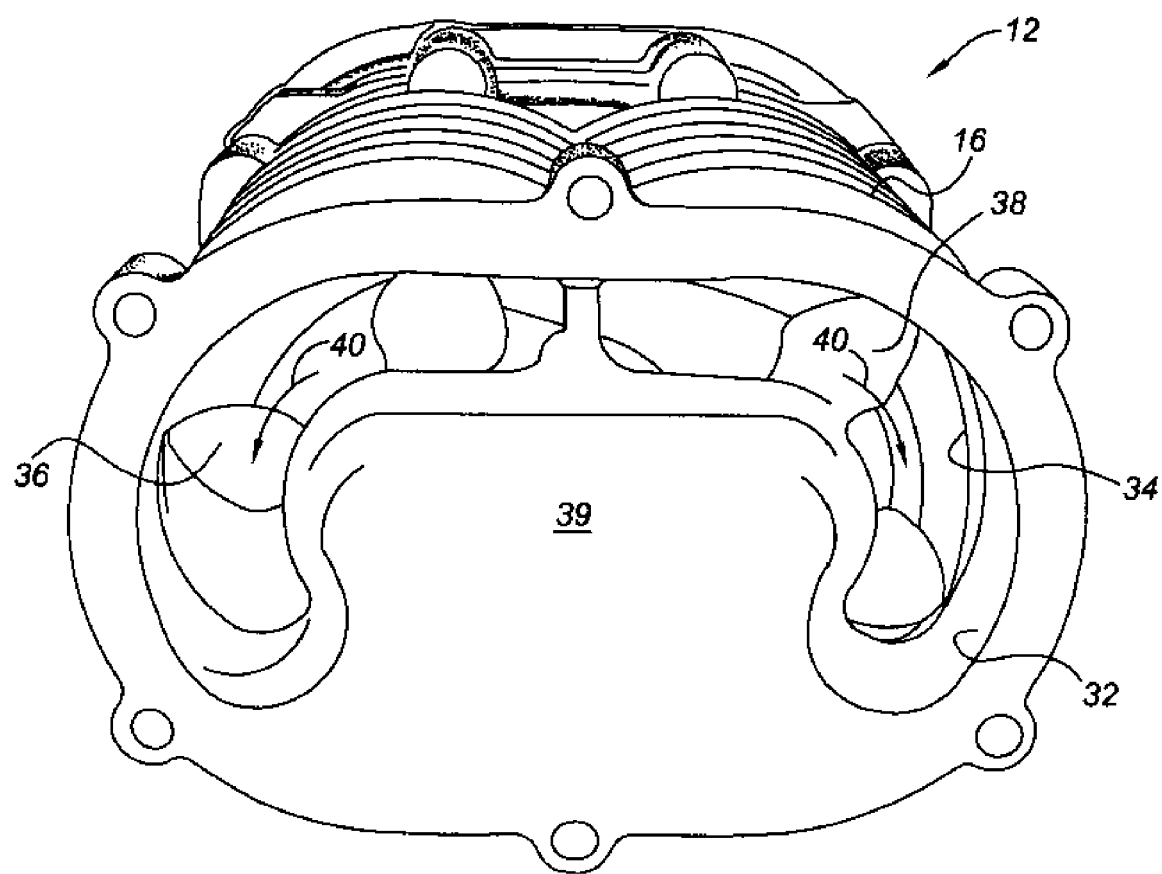
FIG. 2 is a perspective view of the compressor of FIG. 1, with the inlet duct removed, illustrating a first and second rotor.

Referring to FIG. 2, and with continued reference to FIG. 1, there is shown the compressor 12 with the inlet duct 14 removed. The housing 16 defines an inlet opening 32. The inlet opening 32 is generally C-shaped in form and is operable to communicate airflow 22 to a rotor cavity 34. The rotor cavity 34 is defined by the housing 16 and is configured to contain a first and second rotor 36 and 38, respectively, therein. The first and second rotors 36 and 38 are interleaved and are rotatably supported within the rotor cavity 34 by a rotor bearing support 39. The rotor bearing support 39 is formed integrally with the housing 16. The first and second rotors 36 and 38 counter-rotate as indicated by arrows 40 and are operable to convey volumes of air from the inlet opening 32 to an outlet opening, not shown, for subsequent introduction to the internal combustion engine.

Figure 3:
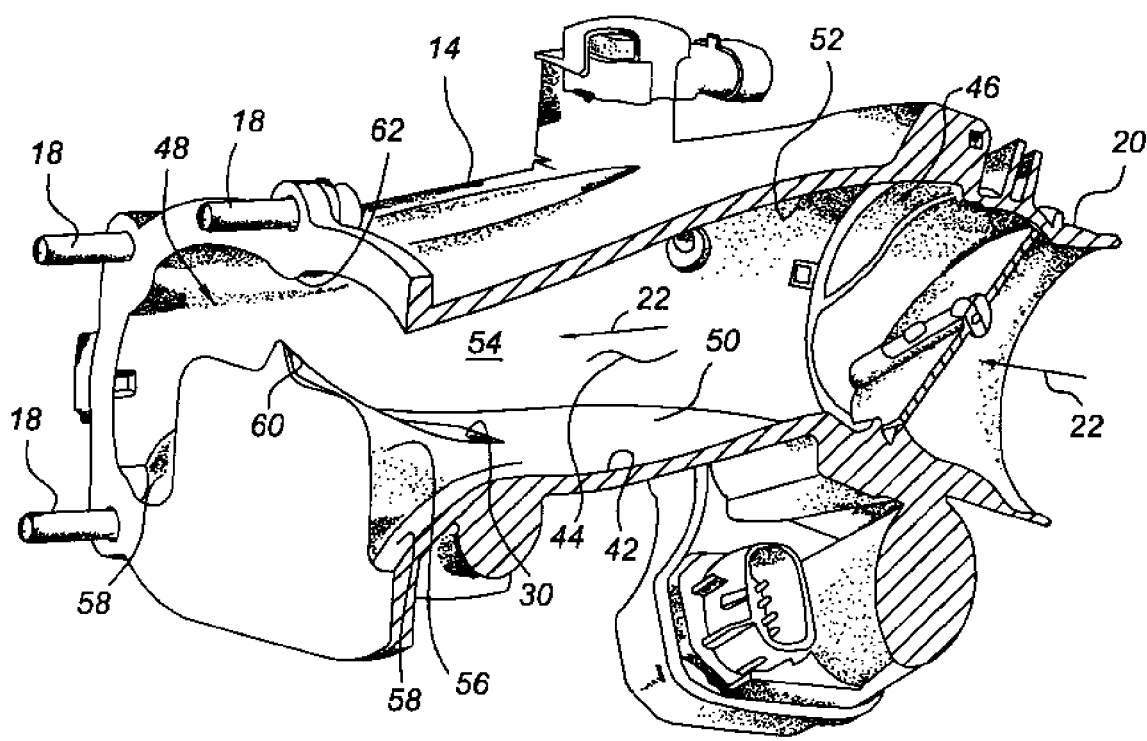
FIG. 3 is a perspective sectional view of the inlet duct of FIG. 1.

Referring to FIG. 3, and with continued reference to FIGS. 1 and 2, there is shown a sectional view of the inlet duct 14 of FIG. 1. The inlet duct 14 has an inner wall 42 that defines a cavity 44 operable to convey airflow 22 between an inlet opening 46 and an outlet opening 48, each defined by the inlet duct 14. The inner wall 42 includes a floor portion 50 and a roof portion 52. Additionally, a sidewall portion 54 interconnects the floor portion 50 and the roof portion 52. A portion 56 of the floor portion 50 is raised in the area of the rotor bearing support 39, shown in FIG. 2, such that the outlet opening 48 is generally C-shaped and substantially similar to the shape of the generally C-shaped inlet opening 32 of the housing 16. As shown in FIG. 3, the portion 56 of the floor portion 50 is raised immediately downstream from the throttle body 20 and increases in height toward the outlet opening 48. Portions 58 of the floor portion 50 are contoured to impart a velocity component to the airflow 22 complementary to the tangential velocity of each of the first and second rotors 36 and 38, shown in FIG. 2, during rotation of the first and second rotors 36 and 38. For instances where the inlet duct 14 is formed separately and mounted to the housing 16, the perimeter of the outlet opening 48 of the inlet duct 14 should be at or within the contour of the generally C-shaped inlet opening 32 to avoid the potential for turbulence caused by mismatch between the two components.

A first ridge 60 is formed centrally on the floor portion 50 and extends toward the outlet opening 48 of the inlet duct 14. The first ridge 60 is preferably formed with a generally triangular cross-section with increasing height and width moving toward the outlet opening 48 of the inlet duct 14. The first ridge 60 is operable to impart a velocity component to said airflow 22 complementary to the tangential velocity of each of the first and second rotors 36 and 38 during rotation of the first and second rotors 36 and 38. The first ridge 60 is preferably positioned immediately downstream of the bypass passage 30.

Similarly, a second ridge 62 is formed centrally on the roof portion 52 and extends toward the outlet opening 48 of the inlet duct 14. The second ridge 62 is preferably formed with a generally triangular cross-section with increasing height and width moving toward the outlet opening 48 of the inlet duct 14. The second ridge 62 is operable to impart a velocity component to said airflow 22 complementary to the tangential velocity of each of the first and second rotors 36 and 38 during rotation of the first and second rotors 36 and 38. Preferably the first and second ridges 60 and 62 are separated, at least initially, to allow the airflow 22 on each side of the first and second ridges 60 and 62 to equalize; however, the first and second ridges 60 and 62 can be designed to converge to form a septum at the outlet opening 48 of the inlet duct 14.

In instances where the throttle body 20 is tilted with respect to the inlet duct 14, the airflow 22 may be biased to one side of the inlet duct 14 by the throttle body 20. In this case, the inner wall 42 may be shaped to bias the airflow 22 to the other side to balance the distribution of airflow 22 within the inlet duct prior to entering the inlet opening 32 of the compressor 12, shown in FIG. 2.

Figure 4:
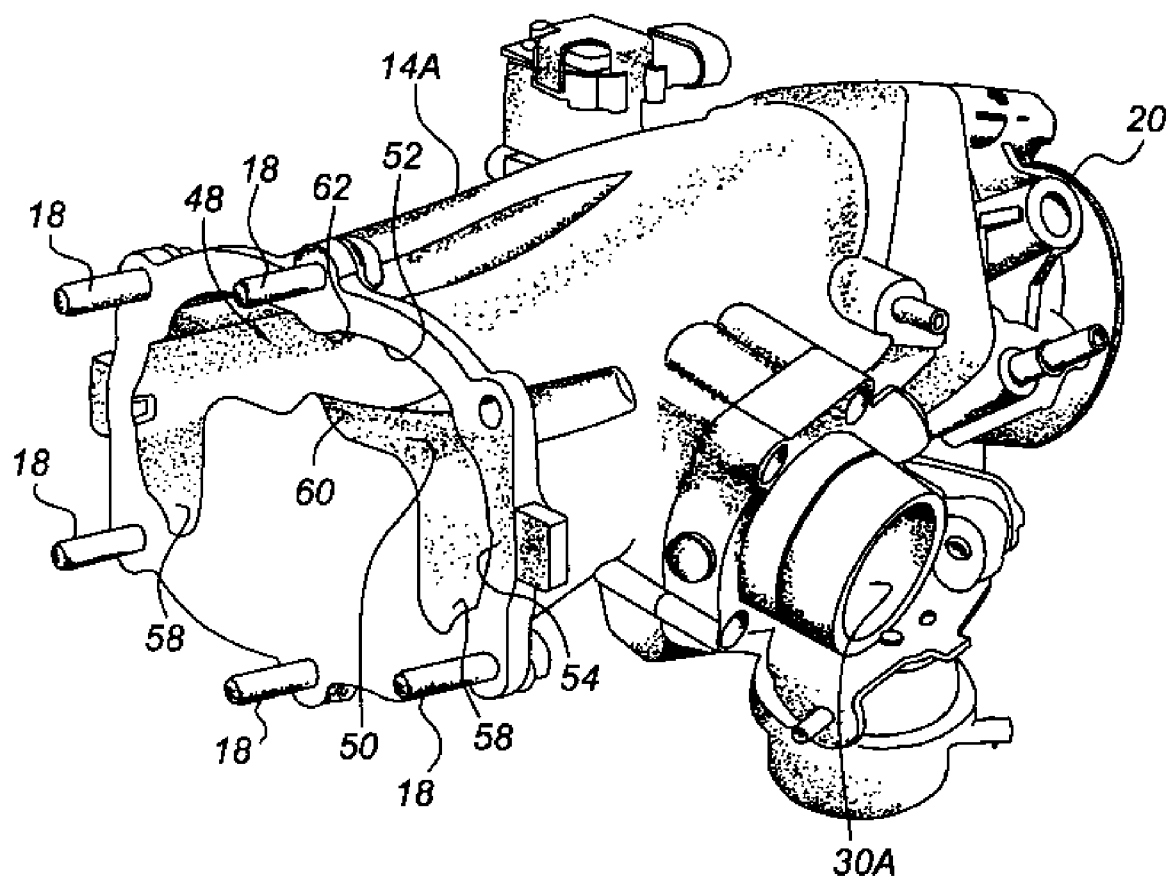
FIG. 4 is a perspective view of an alternate embodiment of the inlet duct of FIGS. 1 and 3, illustrating an alternate position for a bypass passage.

Referring to FIG. 4, there is shown an alternate embodiment of the inlet duct 14 of FIGS. 1 and 3, indicated at 14A. The inlet duct 14A has substantially the same structure as the inlet duct 14, with the exception that a bypass passage 30A is defined by the inlet duct 14A and extends through the sidewall 54 of the inlet duct. Since the bypass passage 30A does not intersect the floor portion 50, the first ridge 60 may extend from any point between the inlet opening 46, shown in FIG. 3, and the outlet opening 48 of the inlet duct.

While the best modes for carrying out the invention have been described in detail, those familiar with the art to which this invention relates will recognize various alternative designs and embodiments for practicing the invention within the scope of the appended claims.

The invention claimed is:

1. An inlet apparatus for a compressor having a housing defining a generally C-shaped inlet opening and a rotor cavity configured to contain interleaved, counter-rotating first and second rotors, the inlet apparatus comprising:
   an inlet duct positioned upstream of the compressor defining an inlet opening and a generally C-shaped outlet opening;
   wherein said inlet duct has an inner wall defining a cavity operable to communicate airflow between said inlet opening and said generally C-shaped outlet opening of said inlet duct;
   wherein said generally C-shaped outlet opening of said inlet duct is substantially similar to the shape of the generally C-shaped inlet opening of the housing;
   wherein said inner wall includes a floor portion and a roof portion, said floor portion and said roof portion extending from said inlet opening to said outlet opening of said inlet duct; and
   wherein at least a portion of said floor portion is contoured to impart a velocity component to said airflow complementary to the tangential velocity of each of the first and second rotors during rotation of the first and second rotors.

2. The inlet apparatus of claim 1, further comprising:
   a first ridge formed centrally on said floor portion and extending toward said outlet opening of said inlet duct;
   wherein said first ridge increases in at least one of height and width moving toward said outlet opening of said inlet duct; and
   wherein said first ridge is operable to impart a velocity component to said airflow complementary to the tangential velocity of each of the first and second rotors during rotation of the first and second rotors.

3. The inlet apparatus of claim 1, further comprising:
   a second ridge formed centrally on said roof portion and extending toward said outlet opening of said inlet duct;
   wherein said second ridge increases in at least one of height and width moving toward said outlet opening of said inlet duct; and
   wherein said second ridge is operable to impart a velocity component to said airflow complementary to the tangential velocity of each of the first and second rotors during rotation of the first and second rotors.

4. The inlet apparatus of claim 2, wherein said first ridge is generally triangular in cross section.

5. The inlet apparatus of claim 3, wherein said second ridge is generally triangular in cross section.

6. The inlet apparatus of claim 1, wherein said portion of said floor portion is raised immediately downstream from said inlet opening of said inlet duct and increases in height toward said outlet opening of said inlet duct.

7. The inlet apparatus of claim 1, wherein said inlet duct is mounted to the housing.

8. The inlet apparatus of claim 1, wherein said inlet duct defines a bypass passage that extends through said floor portion.

9. The inlet apparatus of claim 1, wherein said inner wall includes a sidewall portion interconnecting said floor portion and said roof portion and wherein said inlet duct defines a bypass passage that extends through said sidewall portion.

10. A compressor assembly comprising:
    a housing defining a generally C-shaped inlet opening and a rotor cavity;
    wherein said generally C-shaped inlet opening is operable to communicate airflow to said rotor cavity;
    a first rotor interleaved with a second rotor, said first and second rotors being rotatably contained within said rotor cavity;
    wherein said first and second rotors are configured to counter-rotate;
    an inlet duct positioned upstream of said housing, said inlet duct defining an inlet opening and a generally C-shaped outlet opening;
    wherein said inlet duct has an inner wall defining a cavity operable to communicate airflow between said inlet opening and said generally C-shaped outlet opening of said inlet duct;

wherein said generally C-shaped outlet opening of said inlet duct is substantially similar to the shape of said generally C-shaped inlet opening of said housing;

wherein said inner wall includes a floor portion and a roof portion, said floor portion and said roof portion extending from said inlet opening to said outlet opening of said inlet duct; and wherein at least a portion of said floor portion is contoured to impart a velocity component to said airflow complementary to the tangential velocity of each of said first and second rotors during rotation of said first and second rotors.

11. The compressor assembly of claim 10, wherein said inlet duct further includes:

a first ridge formed centrally on said floor portion and extending toward said outlet opening of said inlet duct;

wherein said first ridge increases in at least one of height and width moving toward said outlet opening of said inlet duct; and wherein said first ridge is operable to impart a velocity component to said airflow complementary to the tangential velocity of each of said first and second rotors during rotation of said first and second rotors.

12. The compressor assembly of claim 10, wherein said inlet duct further includes:

a second ridge formed centrally on said roof portion and extending toward said outlet opening of said inlet duct;

wherein said second ridge increases in at least one of height and width moving toward said outlet opening of said inlet duct; and wherein said second ridge is operable to impart a velocity component to said airflow complementary to the tangential velocity of each of said first and second rotors during rotation of said first and second rotors.

13. The inlet section of claim 11, wherein said first ridge is generally triangular in cross section.

14. The inlet section of claim 12, wherein said second ridge is generally triangular in cross section.

15. An inlet for a compressor having a housing defining an inlet opening and a rotor cavity configured to contain interleaved, counter-rotating first and second rotors, the inlet comprising:

an inlet duct positioned upstream of the compressor defining an inlet opening and a generally C-shaped outlet opening;

wherein said inlet duct has an inner wall defining a cavity operable to communicate airflow between said inlet opening of said inlet duct and said generally C-shaped outlet opening of said inlet duct;

wherein said inner wall includes a floor portion and a roof portion, said floor portion and said roof portion extending from said inlet opening to said outlet opening of said inlet duct;

a first ridge formed centrally on said floor portion and extending toward said outlet opening of said inlet duct;

a second ridge formed centrally on said roof portion and extending toward said outlet opening of said inlet duct;

wherein said first and second ridges increase in at least one of height and width moving toward said outlet opening of said inlet duct; and wherein said first and second ridges are operable to impart a velocity component to said airflow complementary to the tangential velocity of each of the first and second rotors during rotation of the first and second rotors.

16. The inlet of claim 15, wherein said outlet opening of said inlet duct is generally C-shaped and wherein said outlet opening of said inlet duct is substantially similar to the shape of the inlet opening of the housing.

17. The inlet of claim 16, wherein at least a portion of said floor portion is contoured to impart a velocity component to said airflow complementary to the tangential velocity of each of the first and second rotors during rotation of the first and second rotors.

18. The inlet of claim 15, wherein said inlet opening of said inlet duct is configured to mount a throttle body.

* * * * *